United States Patent [19]

Miller et al.

[11] Patent Number: 4,477,540

[45] Date of Patent: Oct. 16, 1984

[54] METAL-GAS CELL WITH ELECTROLYTE RESERVOIR

[75] Inventors: Lee E. Miller, Carl Junction; Dennis D. Carr, Jasper, both of Mo.

[73] Assignee: Eagle-Picher Industries, Inc., Cincinnati, Ohio

[21] Appl. No.: 538,088

[22] Filed: Oct. 3, 1983

[51] Int. Cl.[3] ............................................. H01M 4/00
[52] U.S. Cl. ........................................ 429/27; 429/66
[58] Field of Search ............................ 429/66, 67–70, 429/27–29

[56] References Cited

U.S. PATENT DOCUMENTS

| | | | |
|---|---|---|---|
| 3,716,708 | 2/1973 | Kaye | 429/67 X |
| 3,867,199 | 2/1975 | Dunlop et al. | 429/101 |
| 3,975,210 | 8/1976 | Warnock | 429/82 |
| 4,038,461 | 7/1977 | Warnock | 429/21 |
| 4,115,630 | 9/1978 | Van Ommering et al. | 429/72 |
| 4,177,328 | 12/1979 | Rogers | 429/81 |
| 4,188,462 | 2/1980 | Klootevyk | 429/68 |
| 4,389,466 | 6/1983 | Joy | 429/27 |

Primary Examiner—Charles F. Lefevour
Attorney, Agent, or Firm—Wood, Herron & Evans

[57] ABSTRACT

A metal-gas electrochemical cell is disclosed wherein electrolyte is progressively supplied from a reservoir into the electrode or cell stack as needed, so as to maintain each stack component with adequate electrolyte, as the plates "grow" and absorb electrolyte with repeated cycling. The reservoir preferably is a compressible bladder positioned between one end of the plate stack and a retaining plate. As the plate stack "grows" with repeated cycling, the bladder is slowly compressed, forcing electrolyte from the bladder through an electrolyte distribution tube located within the plate stack. One end of the electrolyte distribution tube is fixed to an end plate of the plate stack and the second end of the distribution tube may be connected to a Belleville washer or other spring which acts through the distribution tube to compress the plate stack. The elasticity of the spring permits the stack to expand as the electrodes grow.

8 Claims, 4 Drawing Figures

METAL-GAS CELL WITH ELECTROLYTE RESERVOIR

FIELD OF THE INVENTION

The present invention relates to the mechanical structure of an electrolyte "starved" electrochemical cell. More particularly, the present invention relates to an improved structure for a metal-gas electrochemical cell wherein stored electrolyte is supplied to the electrode plate stack as the stack grows or expands during use.

Further, the present invention relates to an automatic method of dispensing electrolyte to the plate stack wherein electrolyte is dispensed only as needed, as the stack grows and absorbs electrolyte.

BACKGROUND OF THE INVENTION

Metal-gas cells, particularly nickel-hydrogen cells, are known in the art. These cells are contained in a sealed vessel or casing which contains hydrogen gas under high pressure. Each cell has at least one nickel-containing positive electrode which is spaced from a catalytic negative electrode. Electrodes are generally in the form of plates which are stacked together to form a plate stack. The plate stack includes gas access plates and separators which prevent short circuiting contact between the electrodes and which are saturated with a liquid electrolyte to provide desired cell perfor- mance.

The electrolyte is typically an alkaline medium such as an aqueous solution of alkali metal hydroxide, such as an approximately 30% potassium hydroxide solution. The negative catalytic electrode is a metal powder bonded within a plastic matrix. The metal powder is preferably one such as platinum or palladium black which will catalyze the oxidation or dissociation of hydrogen gas in an aqueous electrolyte. The plastic matrix is desirably tetrafluoroethylene such as "Teflon" brand material made by duPont. The active nickel-containing positive electrode is generally a nickel-oxyhydroxide.

These metal-gas cells are, by preference, electrolyte starved cells. This refers to the quantity of electrolyte within the cell. Generally, the plate stack, including the electrodes and separators, will approach saturation with electrolyte and there may be a slight excess of electrolyte added. However, the majority of the interior of the cell casing which is not occupied by the plate stack is filled with gaseous hydrogen. This is required to provide sufficient hydrogen to react and to provide a gas-filled space to accommodate gases that are generated during the charging or discharging of the cell.

The pressure vessel or casing generally achieves superatomspheric pressure, for example, 20–50 atmospheres. Hydrogen in the vessel passes through an access plate to reach a catalytic negative electrode. The negative electrode causes molecular hydrogen to dissociate into atomic hydrogen which in turn reacts with free hydroxyl groups in the electrolyte to form water plus free electrons. The water and free electrons react with the nickel-oxy-hydroxide positive electrode to form nickel-hydroxide plus free hydroxyl ions.

During charging, opposite reactions occur so that the nickel-hydroxide forms nickel-oxy-hydroxide, water, and free electrons. The reformed active materials tend to be more amorphous than the active materials originally present on the positive electrode. Thus, during repeated charging and discharging cycles, the active faces of the electrodes may tend to increase in volume, or "grow". Since these cells are electrolyte starved, this causes a substantial problem. This growth of the active faces of the positive electrodes compresses the separators, forcing out electrolyte from the separators. The expanded plates are of increased porosity; they capture the electrolyte. The separators become denser and less conductive. Therefore, the plate stack is no longer electrolyte balanced and overall cell efficiency decreases. This eventually contributes to cell failure.

Nickel-hydrogen batteries are quickly becoming the preferred electrical storage system for earth-orbiting satellites. The reasons for this are the long life of the nickel-hydrogen cell, its wide operating range and most importantly, its high energy density. Since these are used in satellites, it is extremely important that the longevity of the cell is maximized. As such, it is critical that some means is provided to compensate for the growth of the plate stack, and preventing effective depletion of electrolyte by providing additional electrolyte to the plate stack progressively as needed.

BRIEF DESCRIPTION OF THE INVENTION

Accordingly, in light of these problems, it is an object of the present invention to provide an improved structure for a metal-gas electrochemical cell, particularly a nickel-hydrogen cell.

Further, it is an object of the present invention to provide a starved electrochemical cell which utilizes the force created by this electrode growth to dispense additional electrolyte to the plate stack from an electrolyte reservoir.

In accordance with the invention, an electrochemical cell is disclosed including a plate stack attached to or bearing against at least one electrolyte reservoir. The electrolyte reservoir has a compressible bladder which, as the plate stack grows, is compressed, and which thereby forces electrolyte from the bladder into the plate stack.

The invention can best be further described by reference to the drawings in which:

DETAILED DESCRIPTION

A metal-gas cell, hereinafter described as a nickel-hydrogen cell, includes a cell or plate stack which is a plurality of alternating negative and positive electrodes connected to negative and positive bus bars, respectively. The bus bars in turn are connected to terminals which extend through the cell casing which contains the pressurized operating gas within the cell.

Figure 1:
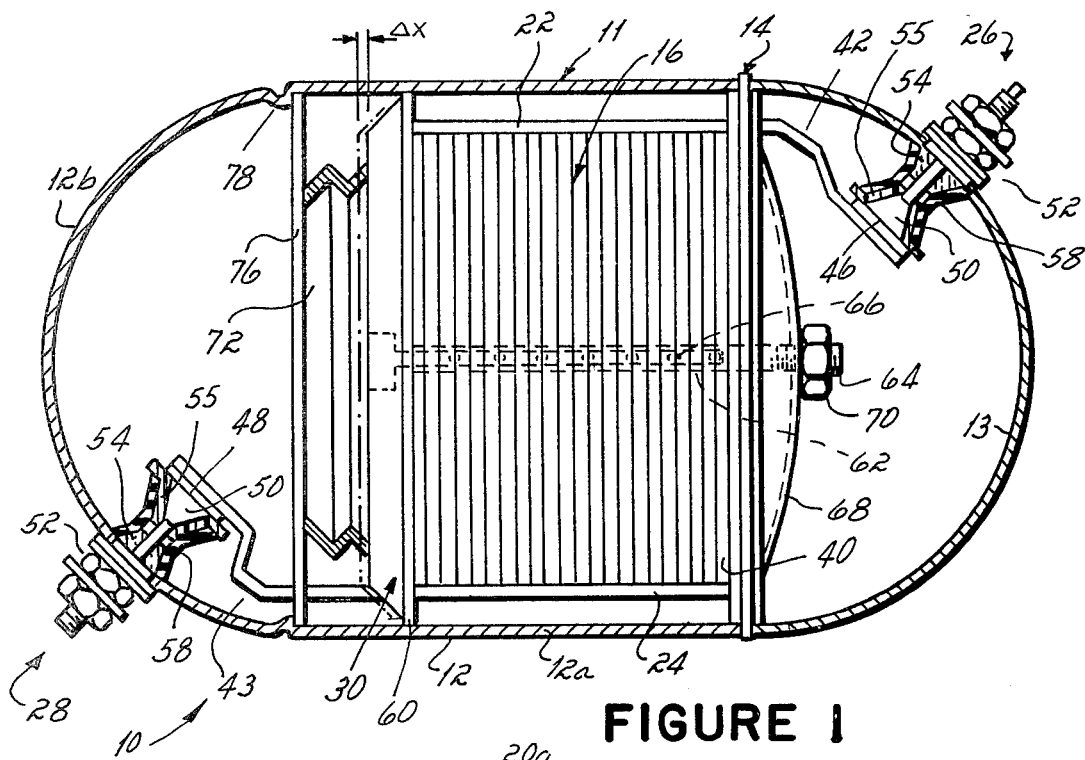
FIG. 1 is an axial section of a preferred form of metal-gas battery according to the present invention.

In FIG. 1 there is shown a nickel-hydrogen cell 10 including an external casing 11. The casing is preferably made from a hard metal such as Inconel 718, an alloy principally composed of 52% nickel, 19% chromium and 18.5% iron, and which is produced by the International Nickel Company. The casing is a two-section casing. One section 12 comprises a cylindrical center portion 12a and a domed end portion 12b. The second section of the casing is an opposing domed end portion 13. The two sections 12 and 13 are welded together at and through an Inconel weld ring 14.

Within the cell casing is a plate stack 16 formed from a plurality of alternating negative electrodes 18 and positive electrodes 20. The electrodes are in turn electrically connected to negative and positive bus bars 22 and 24, respectively, which lead to negative and positive terminals 26 and 28.

Figure 2:
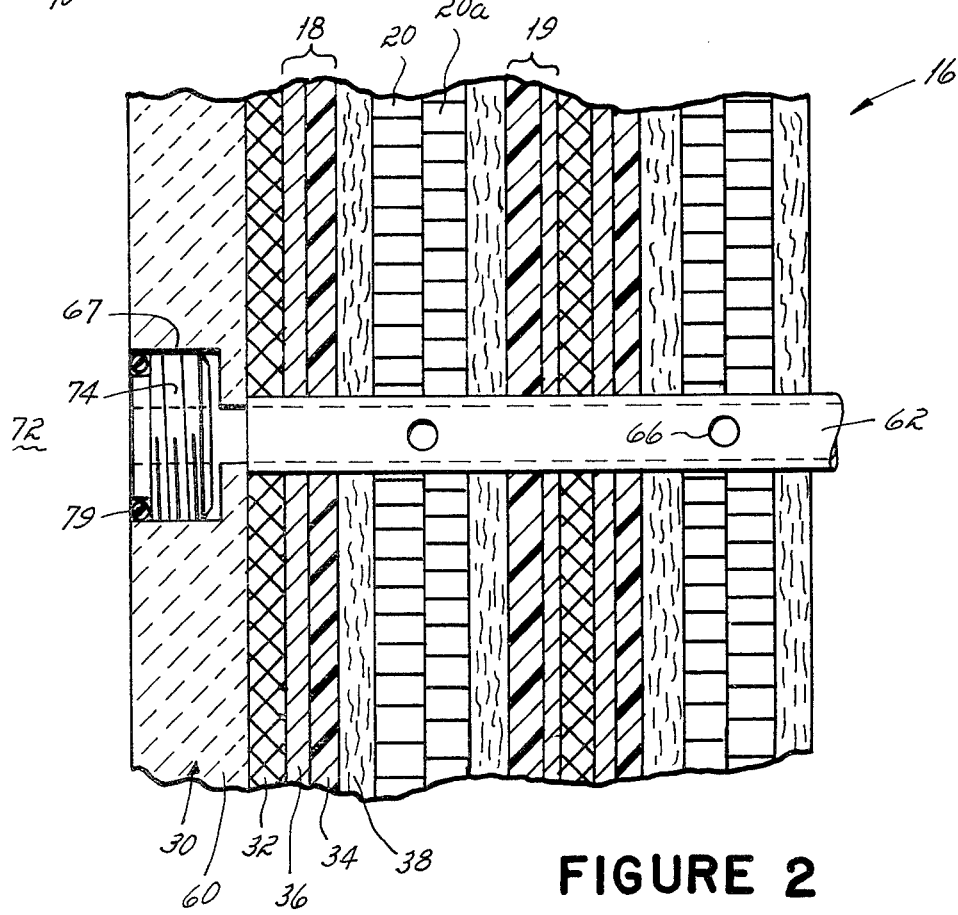
FIG. 2 is a detailed cross section of a portion of the cell stack of a battery in accordance with the present invention.

More particularly, the plate stack is formed from a plurality of layers as shown in detail in FIG. 2. The cell stack begins with a positive end plate 30 adjacent a gas spacer 32 such as a polypropylene mesh material which in turn contacts the laminated negative electrode 18 formed from a support lamina of Teflon backing material 34 and a platinum active lamina or face 36. The negative electrode 18 is separated from a positive electrode 20 by an asbestos separator 38. Adjacent the positive electrode 20 is a second positive electrode 20a, separated from a second negative electrode 19 by another asbestos separator 38. This configuration is repeated throughout the cell stack providing as many negative and positive electrodes as desired. Typically, such a plate stack would include 14 pairs of positive electrodes and 28 individual negative electrodes. The plate stack ends with a negative end plate 40 (see FIG. 1). The individual layers of the plate stack are maintained in facial contact with one another between the positive and negative end plates 30 and 40, respectively.

The bus bars provide a complete electrical path from the negative to the positive terminal of the battery, preferably through the plate stack. As shown in FIG. 1, the bent portions 42 and 43 of the bus bars 22 and 24 are connected to inner ends 46 and 48 of terminals 26 and 28. The terminals extend through openings in the respective domed ends 13 and 12b and are sealed by sealing stucture positioned on the inside of the domed ends. Each terminal has a conical portion 50 which as the terminal is drawn up by nuts 52 compresses correspondingly tapered plastic "Teflon" primary seals 55 and secondary seals 54. The seals 55 and 54 are captured in a surrounding Inconel sleeve 58 which is welded to the domed ends.

Figure 4:
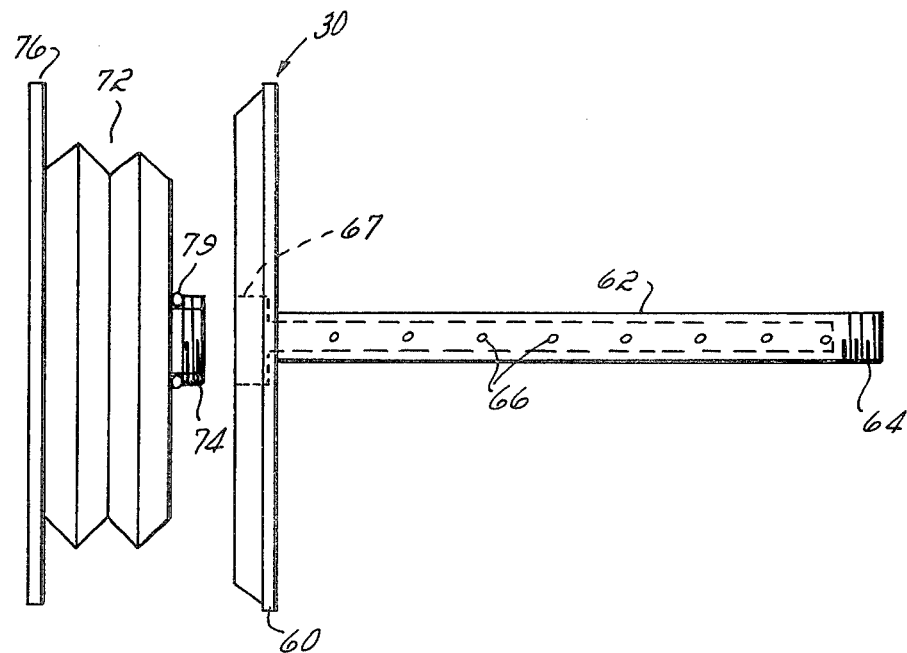
FIG. 4 is a disassembled side view of the positive end plate and reservoir of the plate stack.

The plate stack 16 is maintained under compression by means supported by the cell casing. As shown more particularly in FIG. 1, the plate stack is held compressed between the positive end plate 30 and the negative end plate 40. The positive end plate as shown in FIG. 4 includes a planar plate section 60 and an axially extending tubular section or core 62. The core 62 is hollow throughout its entire length in the stack, except at threaded end 64. A plurality of transverse ports 66 extend from the core to the hollow interior. The planar plate section 60 of the positive end plate includes a central internally threaded opening 67 communicating with the hollow interior of the core 62 so as to provide a fluid path from the positive end plate through the core and through the ports 66.

Figure 3:
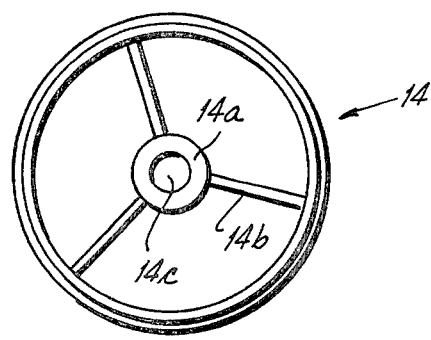
FIG. 3 is a plan view of a weld ring for use in the present invention.

The negative end plate 40 rests against weld ring 14. As shown in FIG. 3, the weld ring is an annular ring including a central hub 14a and axially extending spokes 14b. Hub 14a further includes a central aperture 14c to allow the core 62 to pass through. The positive end plate 30 is positioned at the end of the cell stack opposite the negative end plate 40 with the core 62 extending through the plate stack 16 through the negative end plate 40 and central aperture 14c of weld ring 14. The core finally extends through a Belleville washer 68. Nut 70 screwed onto the threaded end 64 of the core 62 holds the cell stack compressed against the weld ring. The Belleville washer acts as a spring maintaining a compressing force on the cell stack which permits the cell stack to grow or expand during charging and discharging.

Further as shown in FIG. 1, the battery includes an electrolyte reservoir 72. The reservoir is a flexible sealed chamber or bladder having an externally threaded port 74 which threads into the internally threaded opening 67 of the positive end plate 30. The opposite end of the reservoir is a flat planar disc 76 which abuts the cell casing at an annular indent 78. The reservoir 72 is a flexible material, preferably thin flexible stainless steel.

As constructed, the electrolyte reservoir 72 is positioned and is held in the battery casing with its end plate 76 resting against indent 78. Threaded port 74 is screwed into internally threaded opening 67 in the positive end plate. Preferably, an O-ring 79 is used to maintain a seal between the reservoir and the positive end plate. The core 62 of the positive end plate 30 then extends through the plate stack 16 through the negative end plate 40, the weld ring 14 and Belleville washer 68 to which it is secured by a nut 70. Since the weld ring 14 is welded to the casing, both the negative end plate 40 and the Belleville washer 68 are held in a fixed or immovable position relative to the casing.

During operation or use, the repeated charging and discharging of the cell will cause the plate stack to grow or expand in volume. Due to the construction of the battery with the plate stack held compressed by a Belleville washer which yieldably biases the positive end plate toward the negative end plate, the plate stack is permitted to expand and grow. As the plate stack grows in length, the positive end plate 30 will move towards the plate 76 of the reservoir 72 as shown by ΔX in FIG. 1. This in turn will compress the reservoir, forcing electrolyte stored in the reservoir through the positive end plate into the hollow interior of the core 62. This electrolyte will then pass through the core to the cell stack through individual ports 66. Thus, core 62 is an electrolyte distribution tube or means. Preferably, the ports 66 should be located in the area of the positive electrodes 20. Accordingly, as the plate stack grows, additional electrolyte is provided at the positive electrodes maintaining the plate stack properly wetted with electrolyte even though the volume increases.

The preceding was a disclosure of the preferred embodiment of the present invention. The disclosed cell can be modified and yet still incorporate the present invention. For example, two reservoirs could be used, one positioned at each end of the plate stack, or the reservoir could be positioned within the plate stack. Instead of compressible bladder, the electrolyte reservoir can alternately be a large spongelike or felt disc encased in plastic. This construction would be lighter than using a stainless steel bladder.

Accordingly, applicants intend to be bound only by the claims in which we claim:

1. An electrochemical cell including a plurality of positive and negative plates arranged as a plate stack within a cell casing, said plates being saturated with a liquid electrolyte, wherein in cycling use, said plates tend to increase in volume;

said cell further comprising a compressible electrolyte containing reservoir positioned within said casing relative to said plate stack such that an increase in volume of said plate stack compresses said reservoir and forces electrolyte from said reservoir through passage means to distribute electrolyte into said plate stack.

2. An electrochemical cell as claimed in claim 1 wherein said reservoir is a compressible bladder.

3. An electrochemical cell as claimed in claim 2 wherein said passage means to distribute electrolyte comprises an electrolyte distribution tube and said bladder includes an electrolyte exit port in communication with said electrolyte distribution tube, said tube extending into said plate stack and including means to distribute said electrolyte forced from said bladder to a plurality of discrete locations within said plate stack.

4. An electrochemical cell as claimed in claim 1 wherein said electrolyte distribution tube further acts to compress said plate stack.

5. An electrochemical cell as claimed in claim 3 wherein said distribution tube includes a first end fixed to a plate, said plate compressed between said reservoir and a first end of said plate stack;
said electrochemical cell further including a second plate held in fixed relation to said casing and wherein said tube is attached to a biasing means pulling said tube and said first plate toward said second plate.

6. An electrochemical cell as claimed in claim 5 wherein said biasing means comprises a spring held in fixed relation to said casing.

7. An electrochemical cell as claimed in claim 2 wherein said bladder includes a base plate, said base plate resting against an annular indent in said casing, wherein said bladder is held between said plate stack and said base plate.

8. An electrolyte starved nickel-hydrogen electrochemical cell including a plurality of positive and negative electrode plates, said plates forming a plate stack within a cell casing and said plate stack saturated with a liquid electrolyte wherein in use said plates tend to increase in volume;
said cell further comprising an electrolyte-containing reservoir comprising a compressible bladder, said bladder being positioned within said casing between a base plate held in fixed relation to said casing and a first end of said plate stack, said bladder including an electrolyte exit port in communication with an electrolyte distribution tube, said tube extending through said plate stack and including means to distribute said electrolyte forced from said bladder to a plurality of discrete locations within said plate stack;
and wherein said distribution tube includes a first end fixed to a plate, said plate compressed between said first end of said plate stack and said bladder wherein said distribution tube is spring biased, pulling said tube and said first plate toward a second plate at a second end of said plate stack, said second plate being held in fixed relation to said casing; and
whereby an increase in volume of said plate stack compresses said bladder, forcing stored electrolyte through said distribution tube to said discrete locations in said plate stack.

* * * * *